(12) United States Patent
Lin et al.

(10) Patent No.: US 9,605,540 B2
(45) Date of Patent: Mar. 28, 2017

(54) ALTERNATING NOZZLES FOR RADIAL INFLOW TURBINE

(71) Applicant: HONEYWELL INTERNATIONAL, INC., Morristown, NJ (US)

(72) Inventors: Frank Lin, Torrance, CA (US); Davis Jensen, Lomita, CA (US); Marshall Saville, Torrance, CA (US); Phil McAfee, Rancho Palos Verdes, CA (US); David G. Elpern, Los Angeles, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 782 days.

(21) Appl. No.: 13/971,497

(22) Filed: Aug. 20, 2013

(65) Prior Publication Data

US 2015/0056057 A1 Feb. 26, 2015

(51) Int. Cl.
  *F01B 25/02* (2006.01)
  *F01D 1/02* (2006.01)
  *F01D 1/08* (2006.01)
  *F01D 5/14* (2006.01)
  *F01D 9/02* (2006.01)
  *F01D 9/04* (2006.01)

(52) U.S. Cl.
  CPC ............ *F01D 1/08* (2013.01); *F01D 5/141* (2013.01); *F01D 5/143* (2013.01); *F01D 5/145* (2013.01); *F01D 9/02* (2013.01); *F01D 9/04* (2013.01); F05D 2260/96 (2013.01); F05D 2260/961 (2013.01); Y02T 50/673 (2013.01)

(58) Field of Classification Search
  CPC .......... F01D 5/141; F01D 5/143; F01D 5/145; F01D 9/02; F01D 9/04; F04D 29/30; F04D 29/242; F04D 29/24; F04D 29/444
  USPC ..... 415/1, 151, 159, 165, 191, 208.1, 208.2, 415/209.2, 209.4, 194, 195
  See application file for complete search history.

(56) References Cited

U.S. PATENT DOCUMENTS

| | | | | |
|---|---|---|---|---|
| 1,534,721 A * | 4/1925 | Lasche | ...................... | F01D 9/02 415/119 |
| 2,405,282 A * | 8/1946 | Birmann | ............... | F04D 29/464 415/159 |
| 3,006,603 A * | 10/1961 | Caruso | .................... | F01D 5/043 415/1 |
| 3,552,878 A | 1/1971 | Schreiber | | |
| 3,556,680 A * | 1/1971 | Leutwyler et al. | ..... | F04F 13/00 415/119 |
| 3,836,281 A | 9/1974 | Czuszak | | |
| 5,693,992 A * | 12/1997 | Kurusu | ................. | F04D 29/282 310/263 |
| 8,231,326 B2 * | 7/2012 | Mariotti | ................ | F01D 17/165 415/1 |
| 8,277,166 B2 * | 10/2012 | Tecza | ...................... | F01D 9/041 415/1 |
| 8,919,119 B2 * | 12/2014 | Sun | ......................... | F02B 37/24 415/148 |

(Continued)

*Primary Examiner* — Nicholas J Weiss
*Assistant Examiner* — Ngoc T Nguyen
(74) *Attorney, Agent, or Firm* — Shimokaji IP (57) ABSTRACT

A radial inflow turbine may include a wheel, a first set of nozzle vanes surrounding the wheel and a second set of nozzle vanes surrounding the wheel. A first circumferential spacing between two adjacent nozzle vanes of the first set may differ from a second circumferential spacing between another two of the nozzle vanes of the first set.

7 Claims, 6 Drawing Sheets (56) References Cited

U.S. PATENT DOCUMENTS

| | | | |
|---|---|---|---|
| 2009/0041573 A1* | 2/2009 | Serres | F02C 6/12 |
| | | | 415/51 |
| 2009/0041577 A1* | 2/2009 | Serres | F01D 9/026 |
| | | | 415/159 |
| 2010/0126176 A1 | 5/2010 | Kim | |
| 2011/0110766 A1* | 5/2011 | Moore | F01D 17/143 |
| | | | 415/158 |
| 2011/0271666 A1 | 11/2011 | Cords | |
| 2012/0023936 A1* | 2/2012 | Kruiswyk | F01D 9/045 |
| | | | 60/605.2 |
| 2012/0082539 A1* | 4/2012 | Mohiki | F01D 17/165 |
| | | | 415/159 |
| 2013/0000300 A1* | 1/2013 | O'Hara | F01D 9/026 |
| | | | 60/605.2 |
| 2013/0315718 A1* | 11/2013 | Parker | F02B 37/22 |
| | | | 415/157 |
| 2014/0338328 A1* | 11/2014 | Lusardi | F01D 9/026 |
| | | | 60/605.2 |

\* cited by examiner

ALTERNATING NOZZLES FOR RADIAL INFLOW TURBINE

GOVERNMENT RIGHTS

This invention was made with Government support under N00019-02-C-3002 awarded by the U.S. Department of Defense. The Government has certain rights in this invention.

BACKGROUND OF THE INVENTION

The present invention generally relates to radial inflow turbines and more particularly to nozzle configurations that mitigate resonant vibrations in turbine wheels.

Radial inflow turbines may be employed in applications that require varying output. For example, in an aircraft air cycle machine, it is desirable to control turbine output using a simple and efficient inflow system in which fixed-vane nozzles may be mounted directly onto a stator. The stator may divide inflow of gas into a high flow path and a low flow path. Each of the paths may be provided with a series of fixed nozzle vanes. By using either of the two paths separately or in combination, a desirable control of turbine output may be achieved.

As a wheel of the turbine rotates, its blades may interact with downstream edges of the vanes. At some turbine speeds, these blade to vane interactions may occur at an integer multiple of a natural frequency of the wheel, resulting in undesirable resonant vibrations of the wheel. It is possible to change a designed configuration of a wheel of a turbine to eliminate resonant vibrations if such vibrations are observed during initial trial runs of a new turbine design. However, such design reconfigurations are both costly and time-consuming.

As can be seen, there is a need to provide a radial inflow turbine in which resonant vibrations of a wheel are mitigated irrespectively of an initial design shape of the wheel and/or fixed nozzle vanes positioned on a stator of the turbine.

SUMMARY OF THE INVENTION

In one aspect of the present invention, a radial inflow turbine may comprise: a wheel; a first set of nozzle vanes surrounding the wheel; and a second set of nozzle vanes surrounding the wheel, wherein a first circumferential spacing between two adjacent nozzle vanes of the first set differs from a second circumferential spacing between another two of the nozzle vanes of the first set.

In another aspect of the present invention, a radial inflow turbine may comprise: a wheel; a first set of nozzle vanes surrounding the wheel, the nozzle vanes of the first set being circumferentially spaced equidistantly from one another; a second set of nozzle vanes surrounding the wheel, the nozzle vanes of the second set being circumferentially spaced equidistantly from one another, wherein a first one of the nozzle vanes of the first set has an output edge positioned on a first radial line of a stator, wherein a first one of the nozzle vanes of the second set has an output edge on a second radial line of the stator, and wherein the first and the second radial lines of the stator are displaced from one another so that the output edges of the nozzle vanes of the first set are offset from the output edges of the nozzle vanes of the second set.

In still another aspect of the invention, a method for mitigating resonant vibration in a radial inflow turbine may comprise the steps of: providing for a first inflow passageway in fluid communication with blades of a wheel of the turbine; providing for a second inflow passageway in fluid communication with the blades of the wheel; accelerating gas through the first inflow passageway with a first set of nozzle vanes positioned circumferentially in the first inflow passageway around the wheel with equidistant circumferential spacing between adjacent ones of the nozzle vanes; providing for a second set of nozzle vanes positioned circumferentially in the second inflow passageway around the wheel wherein the with equidistant circumferential spacing between adjacent ones of the nozzle vanes, wherein circumferential positioning of the second set of nozzle vanes is offset from the first set of nozzle vanes so that upon rotation of the wheel, any one blade of the wheel passes outlet edges of the first set of nozzle vanes at a time different from a time at which the one blade passes outlet edges of the second set of nozzle vanes.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide for radial inflow turbines with stators having non-uniform circumferential spacing between one or more of a plurality of fixed nozzle vanes so that resonant vibrations of a turbine wheel may be mitigated. Exemplary embodiments may provide for separate paths for inflow of gas into the turbine with fixed nozzle vanes in each of the separate paths.

Figure 1:
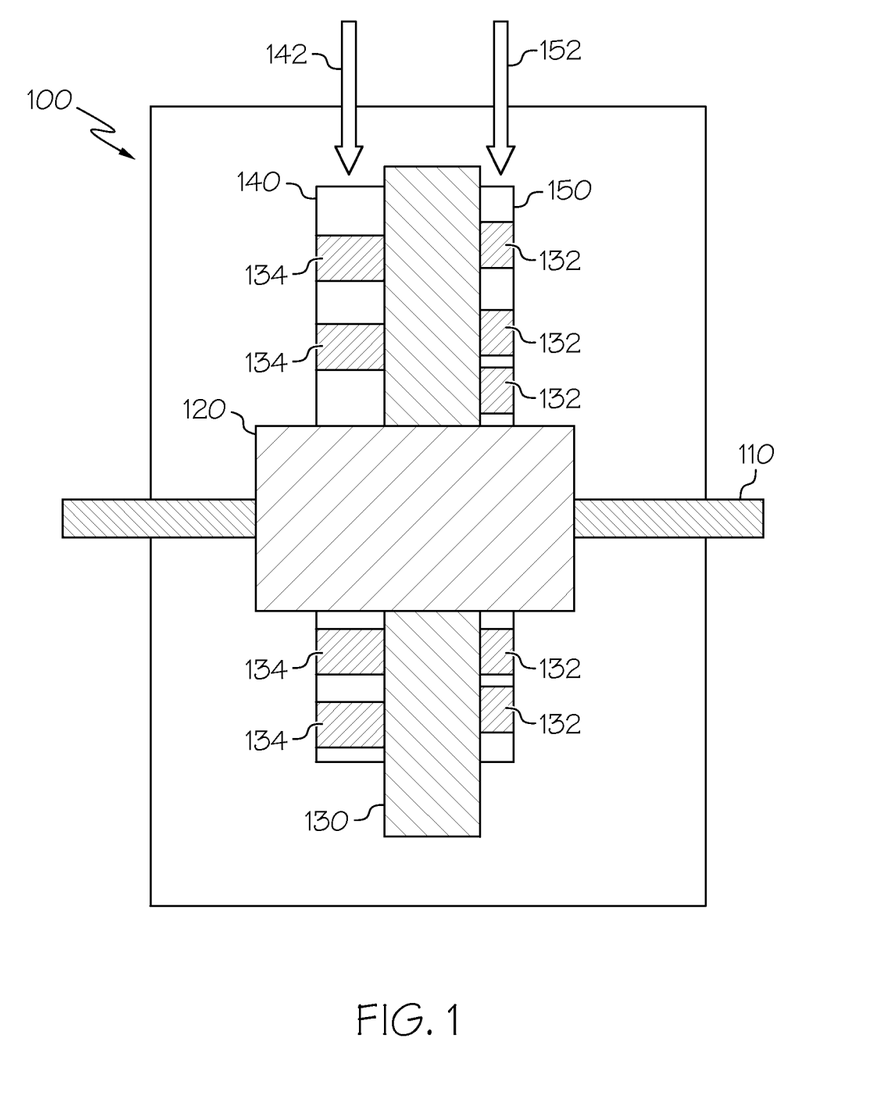
FIG. 1 is a schematic block diagram of a radial inflow turbine in accordance with an embodiment of the invention.

Referring now to FIG. 1, a schematic block diagram shows an exemplary embodiment of a radial inflow turbine 100. The turbine 100 may include a shaft 110, a wheel 120, and a stator 130. A first inflow passageway 140 may be positioned on one side of the stator 130 and a second inflow passageway 150 may be positioned on an opposite side of the stator 130. The stator 130 may be provided with a plurality of fixed nozzle vanes 132 that may extend into the passageway 150. Additionally the stator 130 may be provided with a plurality of fixed nozzle vanes 134 that may extend into the passageway 140.

In operation, gas flow 152 may be introduced into the passageway 150. The vanes 132 may accelerate the flow 152 so that the accelerated flow 152 may impinge on the wheel 120, thereby driving the wheel. Similarly gas flow 142 may be introduced into the passageway 140 and may be accelerated by the vanes 134 so that the accelerated flow may drive the wheel 120. The passageways 140 and 150 may be employed independently of one another to introduce gas into the turbine 100. For example, if a relatively low output of the turbine 100 is desired, then passageway 150, which may be smaller than the passageway 140, may used as the only input passageway. If a higher turbine output is desired, the larger passageway 140 may be employed for introduction of gas. If an even higher output is desired, then both of the passageways 140 and 150 may be employed simultaneously for introduction of gas into the turbine 100.

Figure 2:
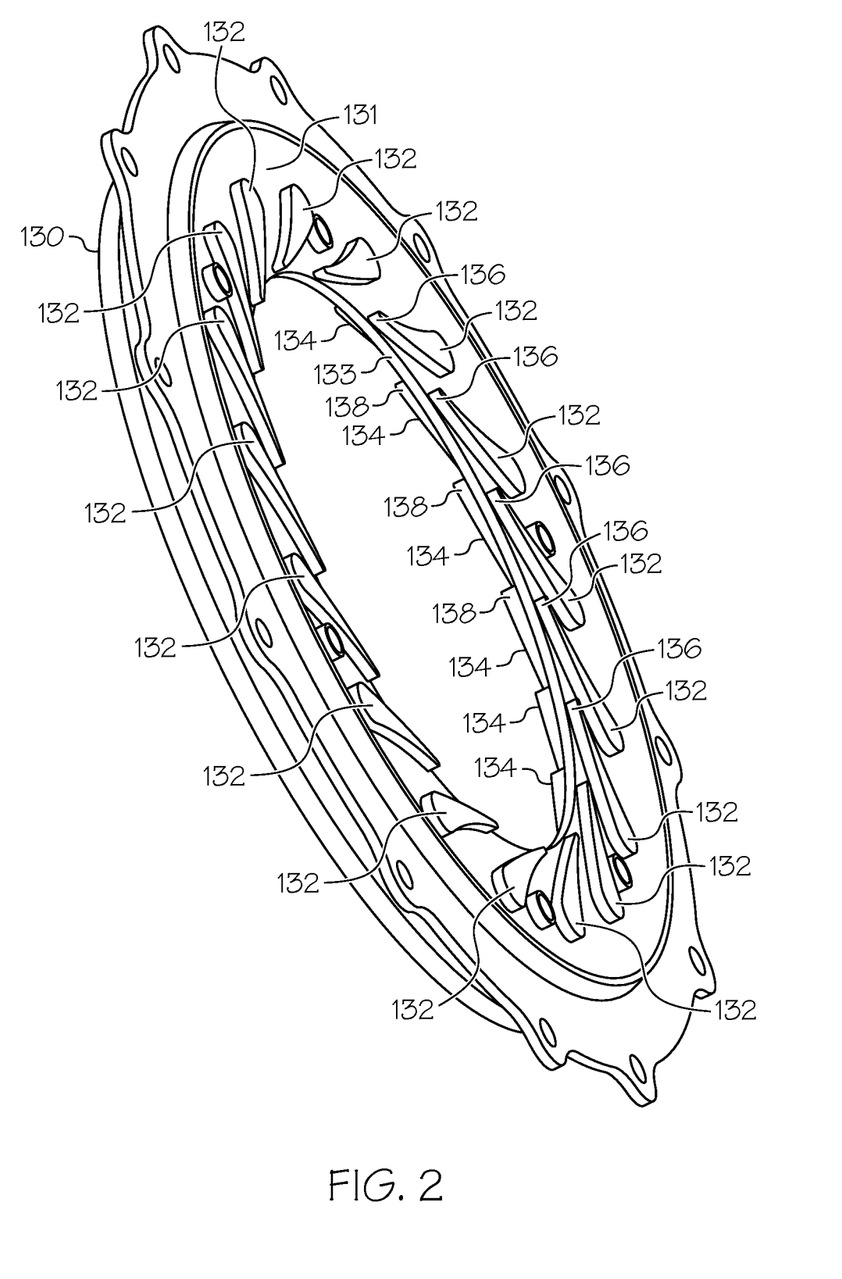
FIG. 2 is a perspective view of a stator of the turbine of FIG. 1 in accordance with an embodiment of the invention.

Referring now to FIG. 2, a detailed view of an exemplary embodiment of the stator 130 is shown. The fixed nozzle vanes 132 may be attached to a first side 131 of the stator 130 and the fixed nozzle vanes 134 may be attached to a second side 133 of the stator 130. The nozzle vanes 132 may have outlet edges 136 and the nozzle vanes 134 may have outlet edges 138.

Figure 3:
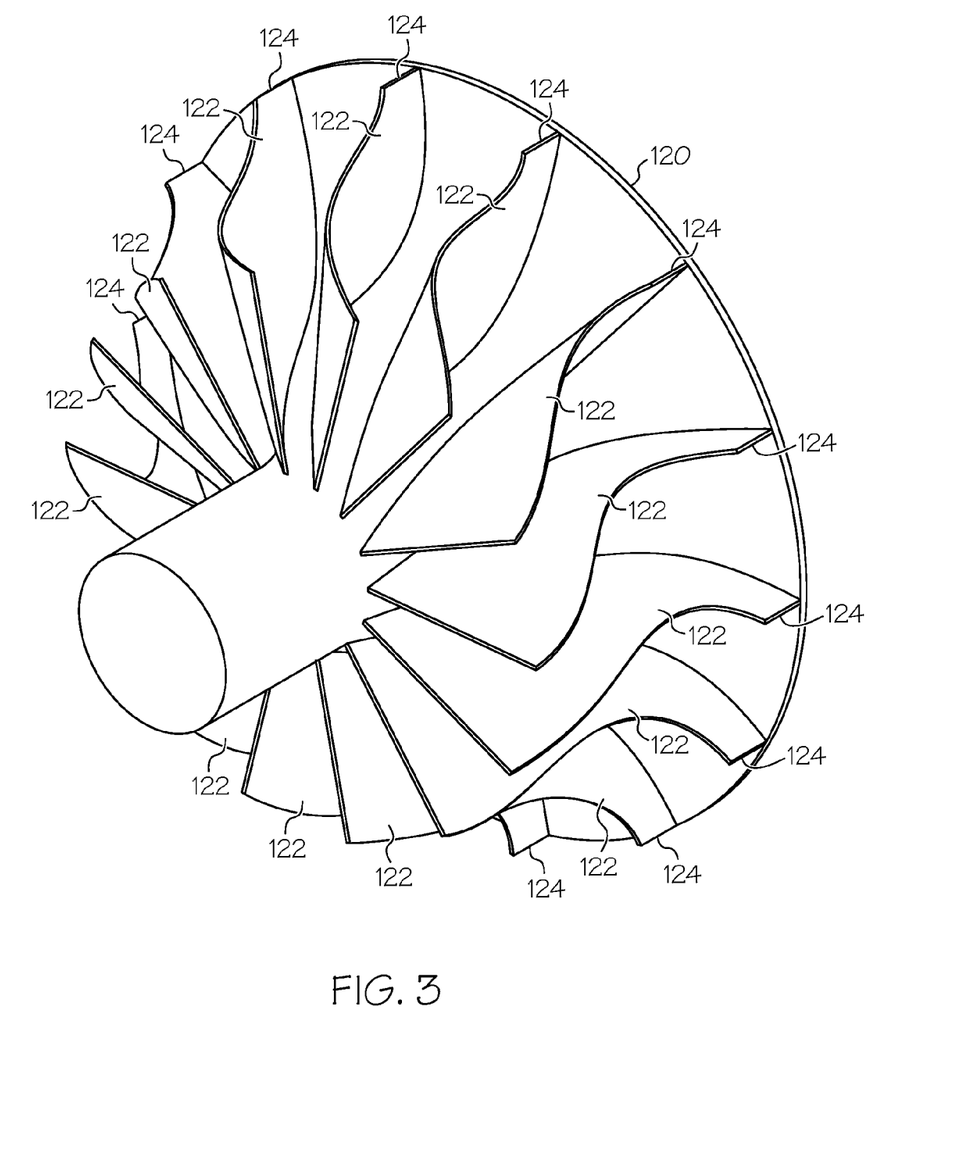
FIG. 3 is a perspective view of a wheel of the turbine of FIG. 1 in accordance with an embodiment of the invention.

Referring now to FIG. 3, a perspective view of an exemplary embodiment of the wheel 120 is shown. The wheel 120 may be provided with a plurality of shaped blades 122. The wheel 120 may have about fourteen of the blades 122. Each of the blades 122 may have an inlet edge 124. During operation of the turbine 100, the inlet edges 124 of the wheel blades 122 may pass the outlet edges 136 and 138 of the nozzle vanes 132 and 134 of FIG. 2. Clearances between the wheel inlet edges 124 and the nozzle vane outlet edges 136 and 138 may be small (e.g., in the order of about 0.005 to about 0.015 inch). In this small clearance setting, a slight pressure pulse may be generated as each inlet edge 124 passes one of the vane outlet edges 136 or 138. These pressure pulses may be inconsequential if the pulses occur at a frequency that is not an integer multiple of a natural frequency of the wheel 120. However, if rotational speed of the wheel 120 reaches a speed that may be an integer multiple of the frequency of the pulses, then a resonant vibration of the wheel 120 may be initiated.

Figure 4:
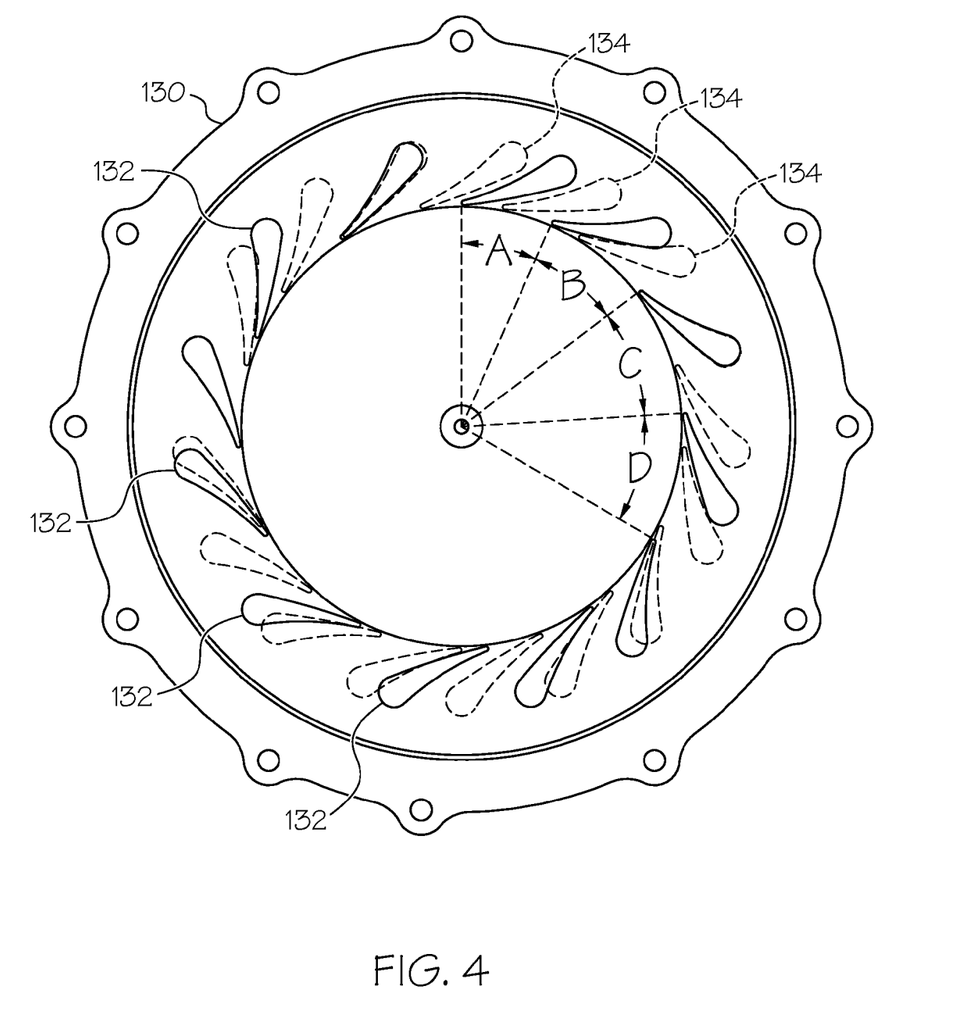
FIG. 4 is an elevation view of a stator of the turbine of FIG. 1 in accordance with a first embodiment of the invention.

Referring now to FIG. 4 there is shown an exemplary embodiment of the stator 130 of the turbine 100 in which likelihood of initiation of resonant vibration may be reduced or mitigated. In the stator 130 the nozzle vanes 132 may be positioned at unequal arc lengths or circumferential spacings For example, wherein a first circumferential spacing between two adjacent nozzle vanes 132 may differ from a second circumferential spacing between another two of the nozzle vanes 132. For example, A may differ from B or C may differ from D. Also, the stator 130 may support the nozzle vanes 134 so that two adjacent ones of the nozzle vanes 134 of the second set are positioned with a third circumferential spacing and another two adjacent ones of the nozzle vanes 132 are positioned with a fourth circumferential spacing different from the third circumferential spacing. It may be seen that the number of the nozzle vanes 132 may differ from the number of the nozzle vanes 134. In that context, a reduced number of the above mentioned pressure pulses may occur at intervals of equal periods. Consequently there may be a reduced probability for development of resonant vibration at any speed of the wheel 120.

Figure 5:
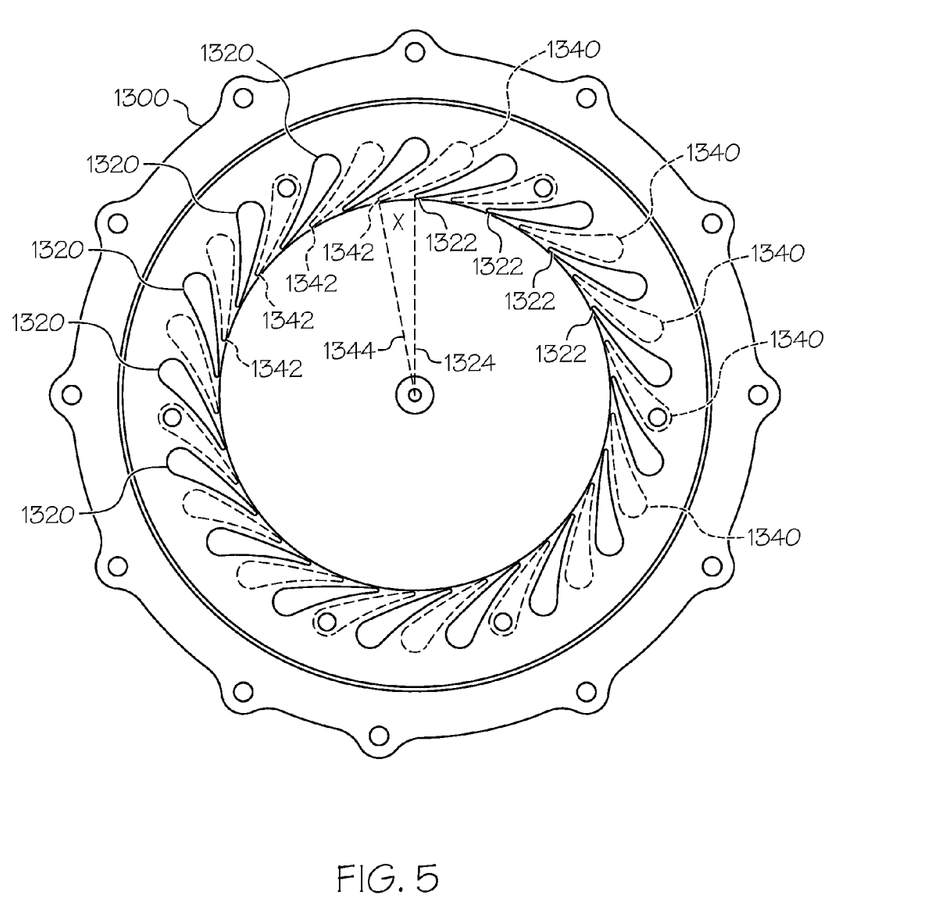
FIG. 5 is an elevation view of a stator of the turbine of FIG. 1 in accordance with a second embodiment of the invention.

Referring now to FIG. 5, there is shown an exemplary embodiment of a stator 1300 wherein nozzle vanes 1320 may be circumferentially spaced equidistantly from one another on one side of the stator 1300 and nozzle vanes 1340 may be circumferentially spaced equidistantly from one another on an opposite side of the stator 1300. The stator 1300 may include seventeen of the nozzle vanes 1320 and seventeen of the nozzle vanes 1340.

One of the nozzle vanes 1320 may be positioned so that it has its output edge 1322 on a radial line 1324 of the stator 1300. One of the nozzle vanes 1340 may be positioned so that it has its output edge 1342 on a radial line 1344 of the stator 1300. Outer ends of the radial lines 1324 and 1344 may be displaced from one another by a circumferential distance X, where X is a circumferential distance less than a circumferential space between any two adjacent ones of the vanes 1320. Consequently the output edges 1322 of the nozzle vanes 1320 may be offset from the output edges 1342 of the nozzle vanes 1340. In other words, the vanes 1340 may be considered to be offset from the vanes 1320.

It may be seen that pressure pulses between the inlet edges 122 (see FIG. 3) of the wheel blades 120 may occur at a frequency that is twice as high as a frequency that would otherwise develop if the vanes 1320 and 1340 were to overly one another instead of being offset from one another. Consequently, the pressure pulses may occur at a frequency that is higher than a speed range of the wheel 120 and the probability of resonant vibration may be reduced or mitigated.

Figure 6:
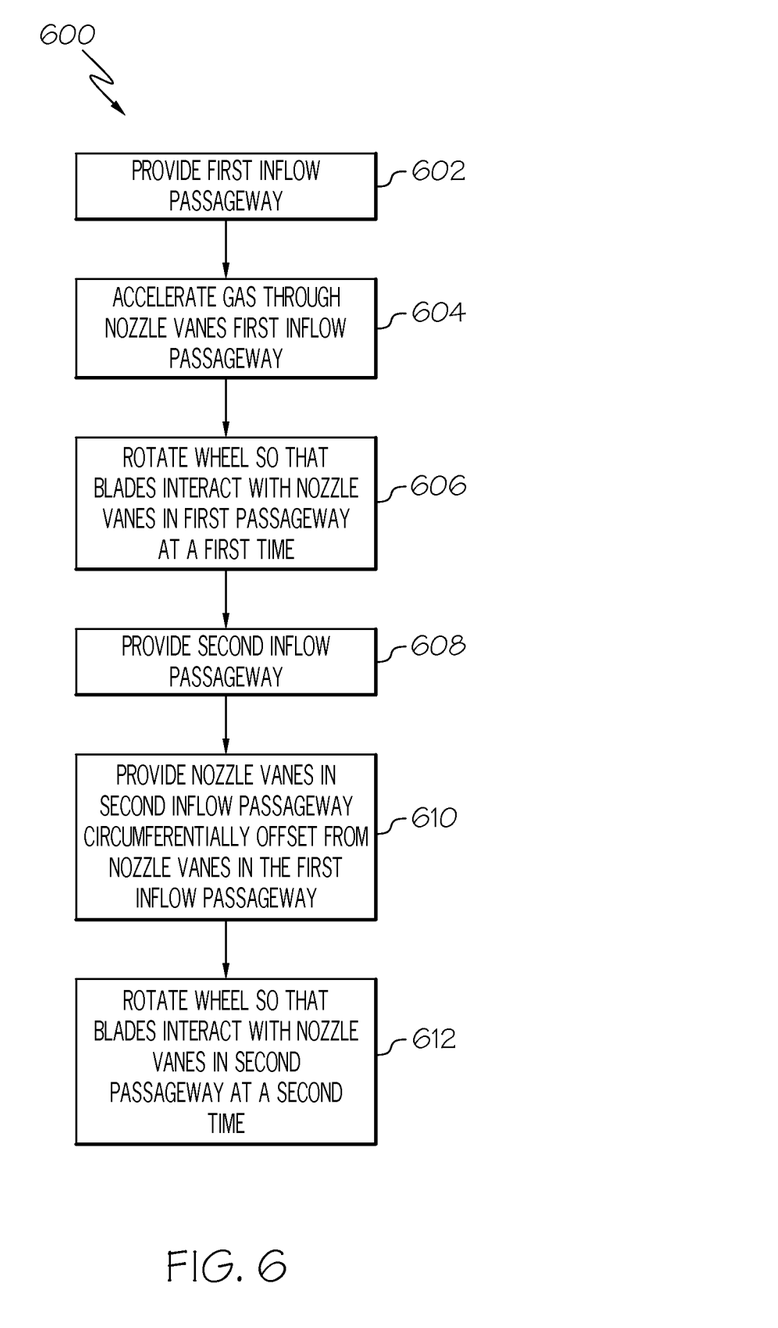
FIG. 6 is a flow chart of a method for mitigating resonant vibration in the turbine of FIG. 1 in accordance with an embodiment of the invention.

Referring now to FIG. 6, a flow chart 600 may illustrate a method for mitigating resonant vibration in a radial inflow turbine. In a step 602, a first inflow passageway may be provided in fluid communication with blades of a wheel of the turbine (e.g., the inflow passageway 140 may provide a fluid passageway to the blades 122 of the wheel 120). In a step 608, a second inflow passageway may be provided in fluid communication with blades of the wheel of the turbine (e.g., the inflow passageway 150 may provide a fluid passageway to the blades 122 of the wheel 120). In a step 604, gas may be accelerated through the first inflow passageway with a first set of nozzle vanes positioned circumferentially in the first inflow passageway around the wheel with equidistant circumferential spacing between adjacent ones of the nozzle vanes (e.g., gas flow 142 may be accelerated by nozzle vanes 134). In a step 610, a second set of nozzle vanes may be positioned circumferentially in the second inflow passageway around the wheel wherein the with equidistant circumferential spacing between adjacent ones of the nozzle vanes wherein circumferential positioning of the second set of nozzle vanes is offset from the first set of nozzle vanes (e.g., the nozzle vanes 132 may be positioned in the inflow passageway 150 circumferentially offset from the nozzle vanes 134). In a step 606 and 612, the wheel may be rotated so that any one blade of the wheel passes outlet edges of the first set of nozzle vanes at a time different from a time at which the one blade passes outlet edges of the second set of nozzle vanes.

It should be understood, of course, that the foregoing relates to exemplary embodiments of the invention and that modifications may be made without departing from the spirit and scope of the invention as set forth in the following claims.

We claim:
1. A radial inflow turbine comprising:
    a wheel;
    a first set of nozzle vanes surrounding the wheel, the nozzle vanes of the first set being circumferentially spaced equidistantly from one another;

a second set of nozzle vanes surrounding the wheel, the nozzle vanes of the second set being circumferentially spaced equidistantly from one another;

wherein a first one of the nozzle vanes of the first set has an output edge positioned on a first radial line of a stator;

wherein a first one of the nozzle vanes of the second set has an output edge on a second radial line of the stator;

wherein the first and the second radial lines of the stator are displaced from one another so that the output edges of the nozzle vanes of the first set are offset from the output edges of the nozzle vanes of the second set, and wherein the offset of the first set of nozzle vanes from the second set of nozzle vanes is one-half of a circumferential space between any two adjacent ones of the first set of nozzle vanes or one-half of a circumferential space between any two adjacent ones of the second set of nozzle vanes;

wherein the first set of nozzle vanes and the second set of nozzle vanes are attached on opposite sides of the stator.

2. The radial inflow turbine of claim 1 wherein the number of nozzle vanes in the first set is equal to the number of nozzle vanes in the second set.

3. The radial inflow turbine of claim 1 wherein the first set of nozzle vanes includes seventeen nozzle vanes and the wheel includes fourteen blades.

4. The radial inflow turbine of claim 1 further comprising:
a first inflow passageway in fluid communication with the wheel;
a second inflow passageway in fluid communication with the wheel;
wherein the first set of nozzle vanes is positioned in the first inflow passageway, and
wherein the second set of nozzle vanes is positioned in the second inflow passageway.

5. The radial inflow turbine of claim 1 wherein, upon rotation of the wheel, inlet edges of blades of the wheel pass within 0.005 inch to 0.010 inch of outlet edges of the nozzle vanes of the first set of nozzle vanes.

6. The radial inflow turbine of claim 1 wherein, upon rotation of the wheel, inlet edges of blades of the wheel pass within 0.005 inch to 0.010 inch of outlet edges of the nozzle vanes of the second set of nozzle vanes.

7. The radial inflow turbine of claim 1 wherein, upon rotation of the wheel, inlet edges of blades of the wheel pass within 0.005 inch to 0.010 inch of outlet edges of the nozzle vanes of the first set of nozzle vanes and the second set of the nozzle vanes.

* * * * *